US011242977B2

(12) United States Patent
Feng

(10) Patent No.: US 11,242,977 B2
(45) Date of Patent: *Feb. 8, 2022

(54) ILLUMINATION DEVICE WITH ELEMENT HAVING ANNULAR COATING

(71) Applicant: Lumileds LLC, San Jose, CA (US)

(72) Inventor: Chunxia Feng, Shanghai (CN)

(73) Assignee: Lumileds LLC, San Jose, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/749,853

(22) Filed: Jan. 22, 2020

(65) Prior Publication Data

US 2020/0158313 A1 May 21, 2020

Related U.S. Application Data

(63) Continuation of application No. 15/992,876, filed on May 30, 2018, now Pat. No. 10,578,278.

(30) Foreign Application Priority Data

Jul. 26, 2017 (EP) .................................... 17183334

(51) Int. Cl.
*F21V 3/04* (2018.01)
*F21V 7/28* (2018.01)
(Continued)

(52) U.S. Cl.
CPC .................. *F21V 7/28* (2018.02); *F21V 3/02* (2013.01); *F21V 5/007* (2013.01); *F21V 5/048* (2013.01);
(Continued)

(58) Field of Classification Search
CPC ... F21V 3/049; F21V 3/08; F21V 3/12; F21V 5/10; F21V 7/26; F21V 7/30; F21V 9/32
See application file for complete search history.

(56) References Cited

U.S. PATENT DOCUMENTS 1,457,565 A * 6/1923 Warrick .................. F21S 41/28
362/510
4,209,825 A * 6/1980 Shackelford ............ F21S 41/43
362/299
(Continued)

FOREIGN PATENT DOCUMENTS

CN 101363588 A 2/2009
CN 102760823 A 10/2012
(Continued)

OTHER PUBLICATIONS

"U.S. Appl. No. 15/992,876, Final Office Action dated Aug. 5, 2019", 15 pgs.
(Continued)

*Primary Examiner* — Julie A Bannan
(74) *Attorney, Agent, or Firm* — Schwegman Lundberg & Woessner, P.A.

(57) ABSTRACT

Optical lens and light emitting device designs achieve uniform light distribution without producing a light "hot spot", with a benefit of reducing the number of light sources needed and overall cost for direct-lit backlight device. The optical lens includes coating portions or structures on the bottom surface thereof, and a backlight device, or other light emitting device, incorporating said lens, to produce a uniform distribution of light at a target surface. The disclosed lens and light emitting device are particularly useful when an extremely wide transfer function of backlight is needed.

20 Claims, 5 Drawing Sheets

(51) Int. Cl.

| | | |
|---|---|---|
| *F21V 5/04* | (2006.01) | |
| *F21V 3/02* | (2006.01) | |
| *F21V 5/00* | (2018.01) | |
| *F21V 13/04* | (2006.01) | |
| *G02B 19/00* | (2006.01) | |
| *G02F 1/13357* | (2006.01) | |
| *F21Y 115/10* | (2016.01) | |
| *G02F 1/1335* | (2006.01) | |

(52) U.S. Cl.
CPC .......... *F21V 13/04* (2013.01); *G02B 19/0014* (2013.01); *G02B 19/0028* (2013.01); *G02B 19/0061* (2013.01); *G02F 1/133606* (2013.01); *F21Y 2115/10* (2016.08); *G02F 1/133603* (2013.01); *G02F 1/133607* (2021.01)

(56) References Cited

U.S. PATENT DOCUMENTS

| | | | |
|---|---|---|---|
| 6,841,804 | B1 | 1/2005 | Chen et al. |
| 7,798,679 | B2 | 9/2010 | Kokubo et al. |
| 8,558,967 | B2 * | 10/2013 | Iiyama ............... G02B 19/0028 349/62 |
| 10,082,255 | B2 | 9/2018 | Sussman et al. |
| 10,139,077 | B2 | 11/2018 | Kang et al. |
| 10,408,417 | B2 * | 9/2019 | Fukuda ............... G02B 19/0061 |
| 10,578,278 | B2 | 3/2020 | Feng |
| 2005/0139851 | A1 | 6/2005 | Sato |
| 2008/0101086 | A1 | 5/2008 | Lee |
| 2009/0052192 | A1 | 2/2009 | Kokubo et al. |
| 2011/0026248 | A1 | 2/2011 | Stollwerck et al. |
| 2013/0022981 | A1 | 9/2013 | Pelka et al. |
| 2014/0003044 | A1 | 1/2014 | Harbers et al. |
| 2014/0003059 | A1 | 1/2014 | Wang et al. |
| 2014/0004631 | A1 * | 1/2014 | Chang ..................... H01L 33/54 438/27 |
| 2014/0056006 | A1 | 2/2014 | Jongewaard et al. |
| 2014/0119027 | A1 * | 5/2014 | Takatori ..................... F21V 5/04 362/297 |
| 2014/0254134 | A1 | 9/2014 | Pelka et al. |
| 2014/0293582 | A1 | 10/2014 | Lee et al. |
| 2015/0036347 | A1 | 2/2015 | Hu et al. |
| 2015/0062872 | A1 | 3/2015 | Song et al. |
| 2015/0109559 | A1 * | 4/2015 | Lee .................... G02F 1/133603 349/67 |
| 2015/0219966 | A1 * | 8/2015 | Song ......................... F21V 7/04 362/97.3 |
| 2015/0260371 | A1 * | 9/2015 | Takatori ............. G02B 19/0047 362/97.1 |
| 2017/0084799 | A1 | 3/2017 | Ouderkirk et al. |
| 2017/0212386 | A1 * | 7/2017 | Fujii ................. G02F 1/133603 |

FOREIGN PATENT DOCUMENTS

| | | |
|---|---|---|
| CN | 202733781 U | 2/2013 |
| CN | 203907479 U | 10/2014 |
| CN | 104421840 A | 3/2015 |
| CN | 204404074 U | 6/2015 |
| CN | 204534439 U | 8/2015 |
| CN | 110914746 A | 3/2020 |
| JP | 2009-044016 A | 2/2009 |
| JP | 2011-014555 A | 1/2011 |
| JP | 2013-143219 A | 7/2013 |
| JP | 2013-161900 A | 8/2013 |
| JP | 2016-127030 A | 7/2016 |
| JP | 2017-505519 A | 2/2017 |
| KR | 2008-0064490 A | 7/2008 |
| KR | 2012-0011185 A | 2/2012 |
| KR | 10-1355815 B1 | 1/2014 |
| KR | 2014-0030712 A | 3/2014 |
| KR | 2014-0060625 A | 5/2014 |
| KR | 2014-0132300 A | 11/2014 |
| KR | 2017-0026883 A | 3/2017 |
| TW | 200914872 A | 4/2009 |
| WO | WO-2016087081 A1 | 6/2016 |
| WO | WO-2018224450 A1 | 12/2018 |

OTHER PUBLICATIONS

"U.S. Appl. No. 15/992,876, Non Final Office Action dated Mar. 21, 2019", 14 pgs.

"U.S. Appl. No. 15/992,876, Notice of Allowance dated Oct. 22, 2019", 9 pgs.

"U.S. Appl. No. 15/992,876, Response filed Oct. 4, 2019 to Final Office Action dated Aug. 5, 2019", 14 pgs.

"U.S. Appl. No. 15/992,876, Response filed Jun. 21, 2019 to Non-Final Office Action dated Mar. 21, 2019", 17 pgs.

"International Application Serial No. PCT/EP2018/064654, International Search Report dated Aug. 17, 2018", 4 pgs.

"International Application Serial No. PCT/EP2018/064654, Written Opinion dated Aug. 17, 2018", 8 pgs.

"Chinese Application Serial No. 201880050999.7, Response filed Dec. 25, 2020 to Office Action dated Sep. 16, 2020", (w/ English Translation of Claims), 7 pgs.

"European Application Serial No. 17183334.6, extended European Search Report dated Jan. 30, 2018", 10 pgs.

"Japanese Application Serial No. 2019-567285, Notice of Allowance dated Dec. 8, 2020", (w/ English Translation), 7 pgs.

"Korean Application Serial No. 10-2020-7000132, Notice of Allowance dated Sep. 16, 2020", (w/ English Translation), 8 pgs.

"Chinese Application Serial No. 201880050999.7, Office Action dated Sep. 16, 2020", 10 pgs.

"Japanese Application Serial No. 2019-567285, Response filed Sep. 18, 2020 to Notification of Reasons for Refusal dated Jun. 23, 2020", (w/ English Translation of Claims), 12 pgs.

"Korean Application Serial No. 10-2020-7000132, Response filed Jul. 10, 2020 to Notice of Preliminary Rejection dated May 12, 2020", (w/ English Translation of Claims), 19 pgs.

U.S. Appl. No. 15/992,876 U.S. Pat. No. 10,578,278, filed May 30, 2018, Optical Lens for Extremely Thin Direct-Lit Backlight.

"Japanese Application Serial No. 2019-567285, Notification of Reasons for Refusal dated Jun. 23, 2020", (w/ English Translation), 18 pgs.

"Korean Application Serial No. 10-2020-7000132, Notice of Preliminary Rejection dated May 12, 2020", (w/ English Translation), 4 pgs.

"Taiwanese Application Serial No. 107119279, First Office Action dated Jul. 12, 2021", (w/ English Translation), 7 pgs.

\* cited by examiner

ILLUMINATION DEVICE WITH ELEMENT HAVING ANNULAR COATING

CROSS REFERENCE TO RELATED APPLICATION

This application is a continuation of and claims priority to U.S. patent application Ser. No. 15/992,876, filed May 30, 2018, which claims the benefit of International Patent Application No. PCT/CN2017/087128, filed Jun. 5, 2017, and European Patent Application No. 17183334.6, filed Jul. 26, 2017, all of which are incorporated by reference herein as if fully set forth.

FIELD

The disclosure herein relates generally to a light emitting device and an optical lens for improving luminance uniformity.

BACKGROUND

Light-emitting diode (LED) light sources are commonly and widely used for direct-lit backlight illumination. Computers, personal digital assistants (PDAs), mobile phones, and thin liquid crystal display (LCD) televisions (TVs) are a few examples of backlight screen devices that use direct-lit LED backlights. However, the light intensity distribution range of LEDs is narrow, so a lens may be used on an LED to help distribute the light.

In direct-lit backlight, an array of lenses is placed in front of the light sources to provide a more uniform light output on the surface of the backlight device. A large number of LEDs may be needed depending on the size of the light spot right above the lens, thus increasing the cost. The number of LEDs needed for a backlight can be decreased by increasing the spot size of each individual LED device.

SUMMARY

The disclosure herein describes optical lens and light emitting device designs to achieve uniform light distribution without producing a light "hot spot" with a benefit of reducing the number of light sources needed and overall cost for direct-lit backlight devices. The disclosure herein relates to an optical lens with coating portions and/or structures on the bottom surface thereof, and a backlight device, or other light emitting device, incorporating said lens, to produce a uniform distribution of light at a target surface. The disclosed lens and light emitting device is particularly useful when a wide or extremely wide transfer function of backlight is needed.

According to the disclosure herein, a light emitting device for use as a backlight may include a light source mounted to an annular mounting surface, and an optical lens coupled to, and located above, the light source and the annular mounting surface. The optical lens and the light source may share the same optical axis. The optical lens may include an inner curved surface and an outer curved surface, such that the inner curved surface and the outer curved surface may be radially symmetrical with respect to the optical axis. A coating portion may cover at least a portion of the mounting surface, wherein the coating portion absorbs at least a fraction of light originating from the light source and refracted from the lens to create a uniform light intensity distribution pattern on a light field above the light emitting device. Additionally, or alternatively, a structure portion may cover at least a portion of the mounting surface, wherein the structure portion scatters and redirects at least a fraction of light originating from the light source and refracted from the lens creating a uniform light intensity distribution pattern on a light field above the light emitting device. In an example, the coating portion is on top of the structure portion.

DETAILED DESCRIPTION OF THE EMBODIMENTS

Figure 1:
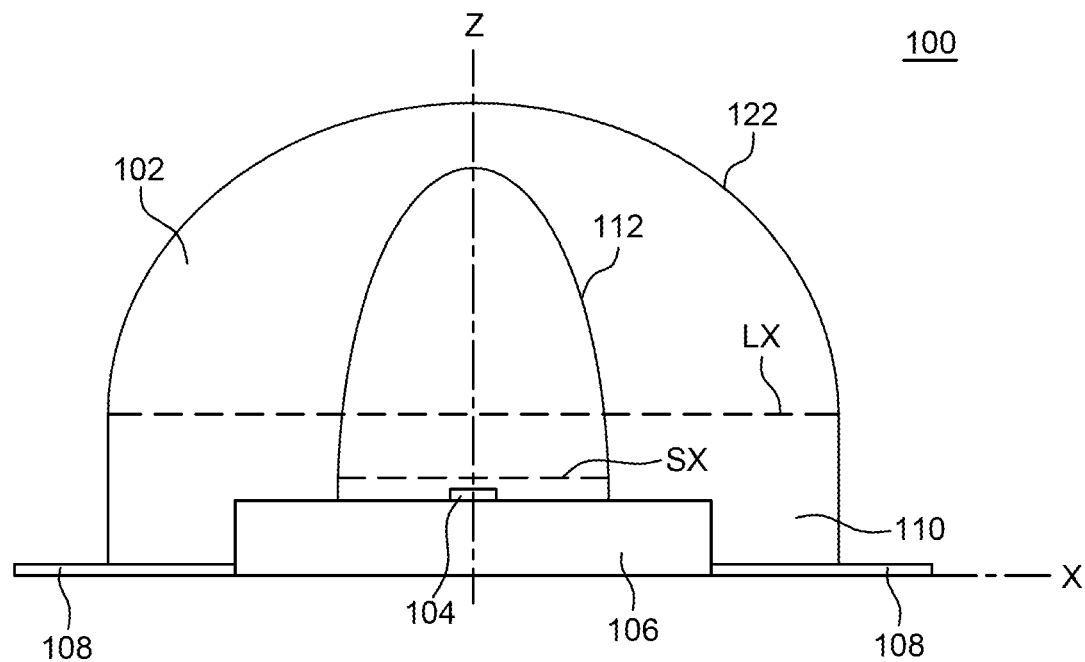
FIG. 1 is a cross-sectional view of an example LED device designed to elaborate the effect of a refractive lens commonly used in a backlight.

Herein, LED device may be used interchangeably with light-emitting device, or backlight device, such that an LED light source or any other type of light source may be similarly used in a light-emitting device. FIG. 1 is a cross-sectional view of an example LED device 100 (or light emitting device 100) designed to elaborate the effect of a refractive optical lens 102 commonly used in a backlight (cross-section shown in the X-Z plane). The LED device 100 may include, but is not limited to include, the following components: a lens 102, including an inner curved surface 112 and an outer curved surface 122; a light source 104 (e.g., an LED or other light source) disposed on a socket 106; terminals 108; and/or a fixing portion 110 to attach the lens 102 to the socket. LX represents the major axis of the outer curved surface 122 and SX represents the minor axis of the inner curved surface 112. The light source 104 may be disposed at a central and lower portion of the optical lens 102 (e.g., below the LX and SX axes and centered around the optical axis Z of the lens 102). For example, a red LED, a blue LED, or a green LED may be employed as the light source 104. The light source 104 may be electrically connected to a circuit board (not shown) through the terminals 108 to apply electrical power to the light source 104.

The refractive optical lens 102 may be a convexo-concave lens. For example, both the inner curved surface 112 and the outer curved surface 122 of the optical lens 102 may have roughly elliptical shapes. For such a convexo-concave lens as lens 102, the light spot emitted from the lens 102 is confined by the bright center of intensity above the lens 102 (directly above the light source 104 centered on the Z axis).

Thus, LED device 100 is limited to applications where the light spot requirement (i.e., the distribution or spread of the light emitted from LED device 100) is not too large.

Figure 2:
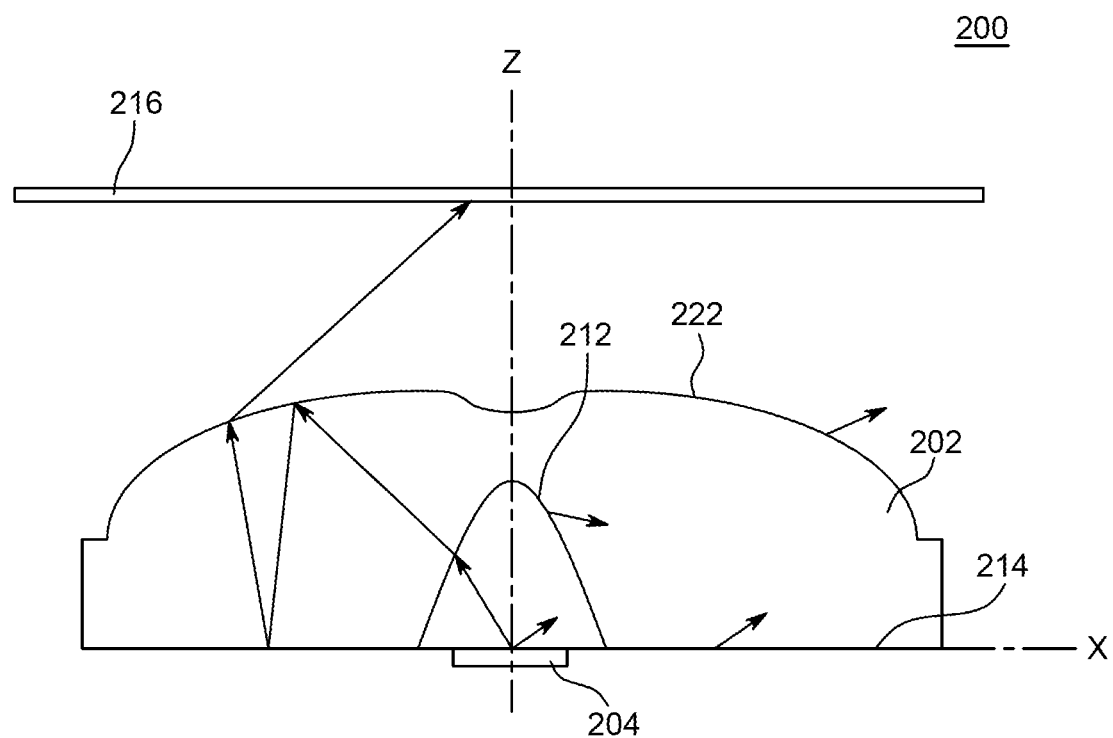
FIG. 2 is a cross-sectional view of an example LED device with a concave optical lens.

As explained above, a much wider light distribution provided by an LED lens can significantly reduce the cost of a backlight by reducing the overall number of LED devices needed in the backlight. FIG. 2 is a cross-sectional view of an example LED device 200 (or light emitting device 200) with a concave optical lens 202. The LED device 200 may include, but is not limited to include, the following components: a lens 202, including an inner curved surface 212 (also referred to as a light incident surface 212) and an outer curved surface 222 (also referred to as a light exit surface 222); a light source 204 (e.g., LED); a base surface 214; and/or a diffuser plate 216 (or more generally a light receiver 216). Sockets and/or terminals as in FIG. 1 may be included, but are not shown in the example LED backlight device 200 of FIG. 2. The diffuser plate 216 may be used, in screen backlights, to evenly distribute light from the light source 204 to reduce or eliminate bright spots, and may be composed of many sheets of plastic in varying thickness, opacity or reflectivity, for example.

The shape of the concave optical lens 202 increases the light scattering angles, shown by arrows, of the light emitted from the light source 204 (e.g., in comparison to the lens 102 used in LED device 100 in FIG. 1) thereby enlarging the light spot above. However, a part of the light generated from the light source 204 is likely to be reflected due to total internal reflection occurring at the lens-air interface, mostly around the center (Z axis) of the light exit surface 222. This also contributes to the "hot spot" of fairly intense light in the center of the illumination field (at and around the Z axis). Thus, the backlight device 200 using concave lens 202, while providing a better light distribution than the backlight (LED) device 100 in FIG. 1, still creates an unsatisfactorily non-uniform light distribution pattern.

Therefore, an object of the present disclosure is to provide an optical lens for a light source that can alleviate the aforementioned drawbacks of existing optical lenses and achieve uniform light distribution on the luminance field. Rapid developments in the direct-lit backlight industry have caused a need for innovative, wider and more uniform lens designs. The lens designs disclosed herein enable uniform light distribution without producing a light "hot spot", and thus have a wider transfer function of light compared with other lenses and decrease the overall cost of the direct-lit backlight device.

The present disclosure relates to a lens with coating portions or structures on the bottom surface thereof, and a backlight device, or other light emitting device, incorporating said lens to produce a uniform distribution of light at a target surface. The disclosed lens is particularly useful when extremely wide transfer function of backlight is needed. The present disclosure is described in more detail below. While the disclosure is described with respect to backlight devices and LED light sources, it is understood by one skilled in the art that the disclosed lens designs may be similarly used with other light sources and light source devices.

Figure 3:
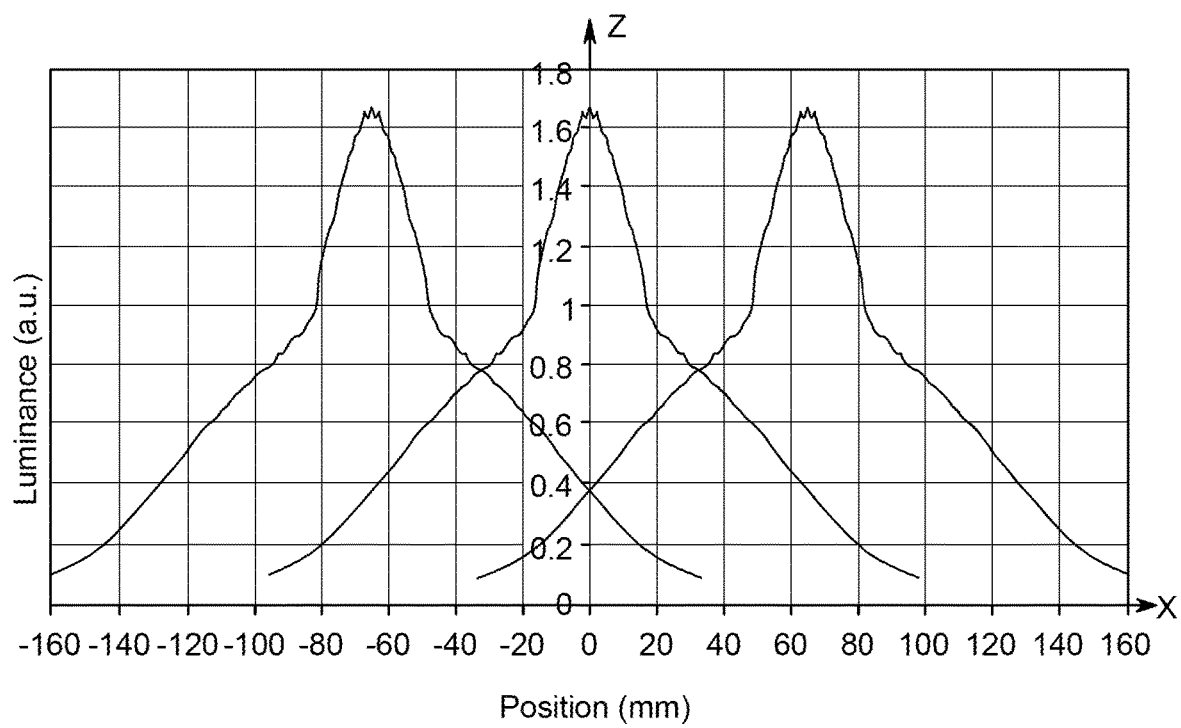
FIG. 3 is a diagram of the transfer function (TF) of the normalized luminance generated by three backlight devices, each similar to the backlight device shown in FIG. 2.

FIG. 3 is a diagram of the transfer function (TF) of the normalized luminance (i.e., intensity of light emitted from a surface per unit area in a given direction, shown normalized in arbitrary units (a.u.)) generated by three backlight devices (centered at the −65 millimeter (mm), 0 mm, and 65 mm positions along the X axis) each similar to the backlight device shown in FIG. 2. In this case, the optical distance (OD), which is the distance traveled by light multiplied by the refractive index of the medium, is as thin as 12 mm while the target full width at half maximum (FWHM) (describing the width of the curve in the TF as the distance between points on the curve at which the function reaches half its maximum value) is 110 mm. There are three hot spots of fairly intense light shown in the TF above the center positions of each of the three light sources/backlight devices (at −65 mm, 0 mm, and 65 mm). Thus, a backlight device using the lens described in FIG. 2 creates an unsatisfactorily non-uniform light distribution pattern on the illumination field, as shown in FIG. 4.

Figure 4:
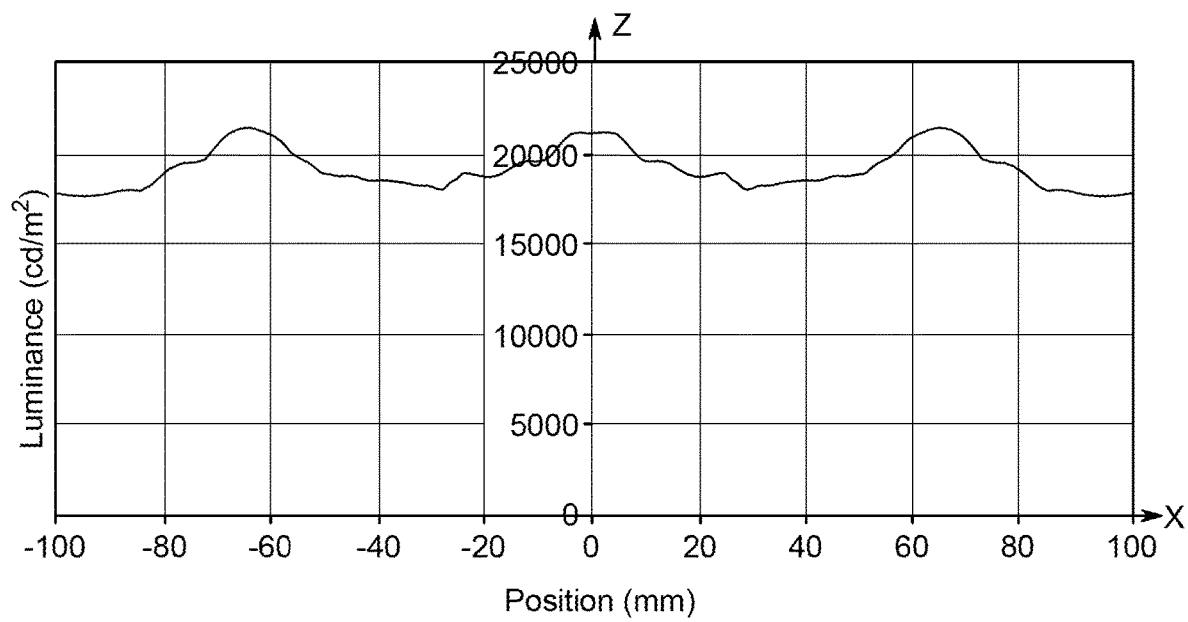
FIG. 4 is a diagram of the luminance (in units of candela per square meter, $cd/m^2$) versus position for the three backlight devices used in FIG. 3.

FIG. 4 is a diagram of the luminance (in units of candela per square meter, $cd/m^2$) versus position for the three backlight devices used in FIG. 3. As in FIG. 3, the three backlight devices (LED light source and lens) used in FIG. 4 have center positions respectively at 0 mm, 65 mm and −65 mm. The OD is 12 mm, and the LED pitch, which is the relative distance between adjacent LEDs/backlight devices, is 65 mm. The hot spot above each LED is still intense even with the cross absorption and refraction of light by the lens of the backlight devices.

Figure 5:
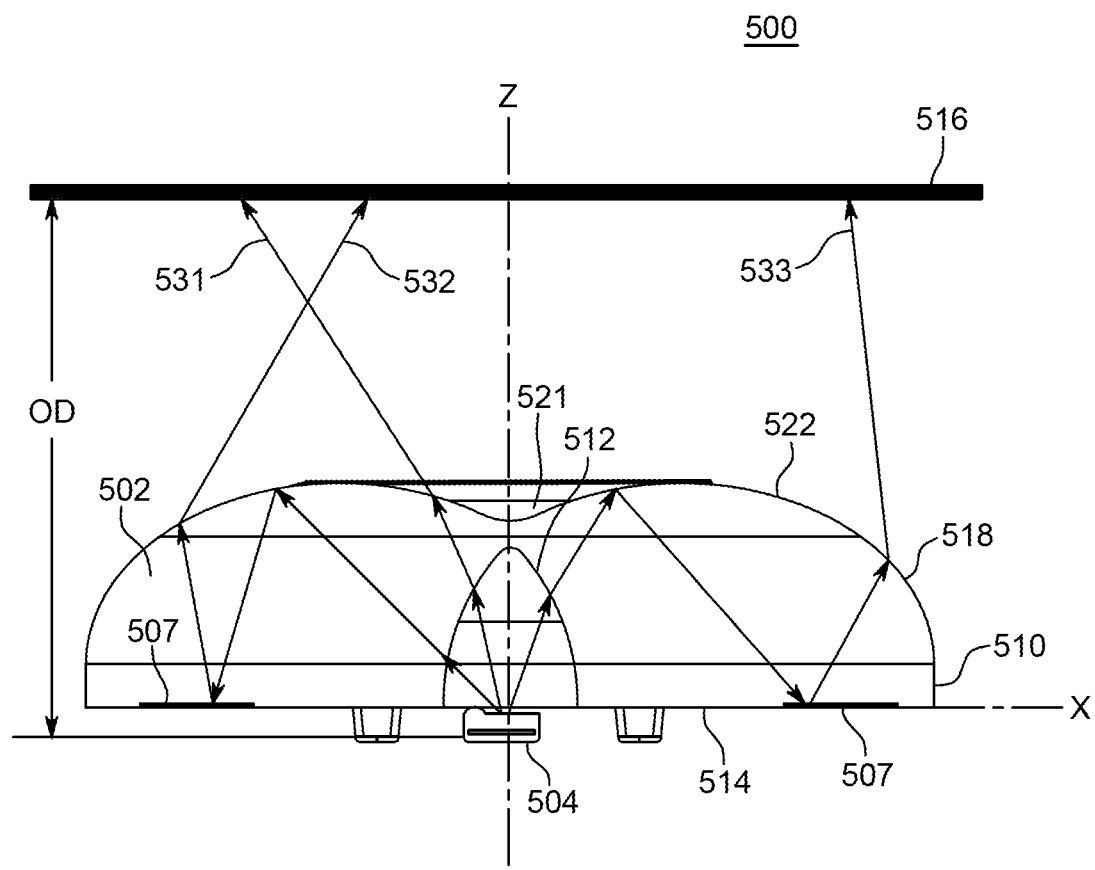
FIG. 5 is a cross-sectional view of an example backlight device.

Referring to FIG. 5, a cross-sectional view of an example light emitting device 500 (e.g., a backlight device) is shown, in accordance with the disclosure herein. The backlight device 500 may include, but is not limited to include, the following components: a lens 502, including a light incident surface 512 (also referred to as an inner curved surface 512) and a light exit surface 522 (or outer curved surface 522), a first cylindrical portion 510, a second convex portion 518, and a recessed portion 521; an LED light source 504 coupled to the lens 502; an annular mounting surface 514 coupled to the lens 502 and the LED light source 504; a coating portion 507 covering at least a portion of the mounting surface 514; and/or a diffuser plate 516 at the OD from the LED light source 504. The LED light source 504 is at the center of circular (X, Y, Z) coordinates.

The lens 502 may include a light incident surface 512 and a light exiting surface 522 opposite to the light incident surface 512. Light generated by the LED light source 504 is refracted into the lens 502 through the light incident surface 512 and then refracted out of the lens 502 from the light exit surface 522. The lens 502 has an optical axis Z extending through the light incident surface 512 and the light exit surface 522. The light incident surface 512 and the light exit surface 522 each are radially symmetrical with respect to the optical axis Z of the lens 502. The optical axis of the LED light source 504 is coincident with the optical axis Z of the lens 502.

The lens 502 further includes an annular mounting surface 514 that interconnects the light incident surface 512 and the light exit surface 522. The light incident surface 512 is located at a center of the mounting surface 514 and recessed inwardly towards the light exit surface 522 from an inner periphery of the annular mounting surface 514. The light incident surface 512 may be a part of an ellipsoid, a sphere, a paraboloid or a continuous spline curve that is machinable (i.e., producible with machinery). The light exit surface 522 includes a first cylindrical portion 510 extending upwardly from an outer periphery of the mounting surface 514 and a second convex portion 518 bending inwardly and upwardly from a top periphery of the first cylindrical portion 510. The second convex portion 518 includes a recessed portion 521 at the central region that recesses inwardly toward the light incident surface 512 of the lens 502.

Light generated from the LED light source 504 is refracted into the lens 502 through the light incident surface 512, and mostly refracted out of the lens 502 from the light exit surface 522 to the light field at the diffuser plate 516.

However, a part of the refracted light impinging on the light exit surface 522 with an incident angle larger than a critical angle for total internal reflection at the lens-air interface (at the light exit surface 522) is reflected back into the lens 502 due to total internal reflection. For example, if the lens 502 is made of polymethyl methacrylate (PMMA) material, the refractive index of the lens 502 is 1.49, and the critical angle for the total internal reflection at the lens-air interface (at the light exit surface 522) is 42.03 degrees.

As described above, the portion of the refracted light with an incident angle smaller than 42.03 degrees is refracted out the lens 502 from the light exit surface 522 of the lens 502, and directs to the center of the light field along path 531. In an example scenario where the backlight device 500 does not having a coating portion 507 on annular mounting surface 514, then the portion of the refracted light with an incident angle larger than 42.03 degrees is reflected by the light exit surface 522 due to the total internal reflection, along paths 532 and 533, which is mostly reflected to the outer part of the annular mounting surface 514 and then reflected to the center of the light field at the diffuser plate 516, thereby creating a sharp peak of light distribution, which may not meet wider TF requirements. Thus, the backlight device 500 without a coating portion 507 creates a non-uniform light distribution.

In another example scenario, the lens 502 of the backlight device 500 includes a coating portion 507 on the annular mounting surface 514. The coating portion 507 may be provided on a portion of the annular mounting surface 514, and the length of the coating portion 507 may vary according to the application. In an example, the coating portion 507 may be a black coating that absorbs all colors of light refracted onto the annular mounting surface 514, or may be any other colored coating that only reflects light with the same color as the coat and absorbs all other colors of light. For example, for a blue coating for coating portion 507 on the annular mounting surface 514, only blue light will be reflected or transmitted and all the other colored light from the light source 504 is absorbed by the coating portion 507. In another example, for a yellow coating portion 507, only yellow light is refracted and all the other colored light from the light source 504 is absorbed by the coating portion 507.

In another example, the coating portion 507 may be a partially absorbing coat, meaning only a certain ratio of light is absorbed by the coating portion 507 and all the other light is reflected or transmitted. The partially absorbed light may be of a single color, a plurality colors or all the colors emitted from the LED light source 504. The light that is not absorbed by the coating portion 507 may be reflected or transmitted, and will partially add to the center light intensity of the light field at the diffuser plate 516. For example, a partially absorbing coating portion 507 may absorb light at a ratio of 10%~100%, or below 10%, depending on the real TF of the lens 502 and the needs of the targeted application.

In another example, the coating portion 507 may cover the entire annular mounting surface 514. In this case, a part of the refracted light with an incident angle larger than 42.03 degrees is absorbed or refracted by the coating portion 507, thus attenuating the light along paths 532 and 533. In an example, a backlight device 500 using a coating portion 507 can create a uniform light intensity distribution pattern on the light field at the diffuser plate 516 and eliminate the "hot spot" effect (e.g., removing the light hot spot shown in FIG. 4).

Moreover, with reference to path 531 in FIG. 5, the refracted light with an angle smaller than 42.03 degrees is refracted out the lens from the light exit surface 522, and is directed toward the center of the light field at the diffuser plate 516. As is the case for an LED light source 504, the color of light in narrow angle may be a little bluish compared to the color of wider angle light from the LED light source 504. Thus, if the coating portion 507 on the annular mounting surface 514 is yellow, the reflected and transmitted light from the yellow coating portion 507 may also be directed to the center of the light field at the diffuser plate 516 and can compensate the bluish light coming from path 531 to produce a white light distribution on the diffuser plate 516.

Figure 6:
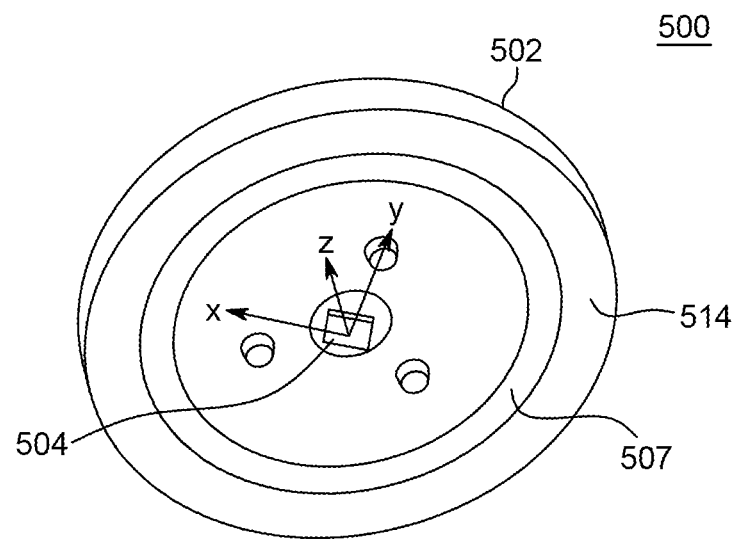
FIG. 6 is a three-dimensional (3D) perspective (underside) view of the example backlight device shown in FIG. 5.

FIG. 6 is a three-dimensional (3D) perspective (underside) view of the example backlight device 500 with optical lens 502 shown in FIG. 5. With reference to FIG. 6, the backlight device 500 includes a lens 502 coupled to an annular mounting surface 514 and coupled to the LED light source 504. The ring on the bottom of the annular mounting surface 514 is the coating portion 507, and may vary in color, size, length, and absorption ratio, among other things, depending on the intended application of the backlight device 500, as described herein.

Figure 7:
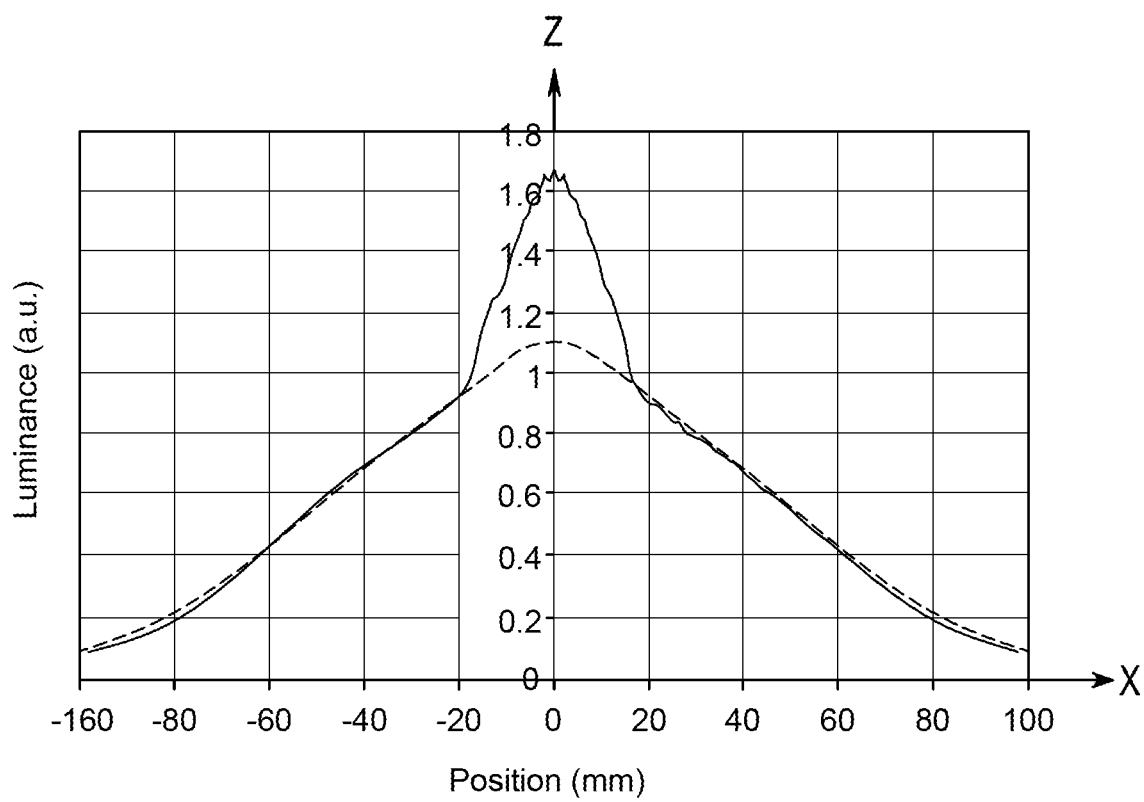
FIG. 7 is a diagram of the TFs of the normalized luminance generated by the backlight device in FIG. 2, shown by a solid line, and the normalized luminance generated by the backlight device of FIG. 5, shown by a dashed line.

FIG. 7 is a diagram the TFs of the normalized luminance generated by the backlight device 200 in FIG. 2, shown by a solid line, and the normalized luminance generated by the backlight device 500 of FIG. 5 (with coating portion 507), shown by a dashed line. The optical axis Z of the LED light source (204 and 504) of the backlight devices (200 and 500) extends through the projected plane at the 0 mm position of the x axis (and y axis). For the TFs shown in FIG. 7, the OD 12 mm and the target FWHM is 110 mm. FIG. 7 illustrates that the center of light intensity (i.e., the peak of the TF) is greatly decreased using the lens 502 and backlight device 500 according to FIG. 5, in comparison to the lens 202 and backlight device 200 of FIG. 2. Thus, the backlight device 500 of FIG. 5 provides a more uniform distribution of light at the diffuser plate 516.

Figure 8:
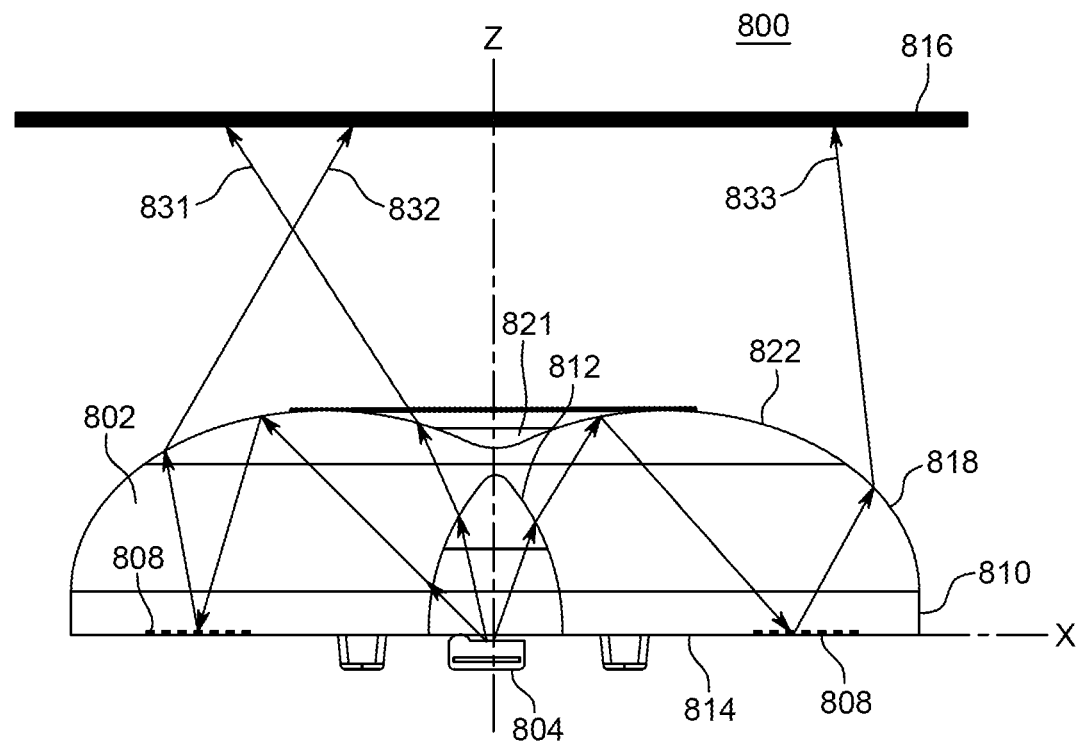
FIG. 8 is a cross-sectional view of another example backlight device.

Referring to FIG. 8, a cross-section view of another example backlight device 800 is shown, in accordance with the disclosure herein. The backlight device 800 may include, but is not limited to include, the following components: a lens 802, including a light incident surface 812 and a light exit surface 822, a first cylindrical portion 810, a second convex portion 818, and a recessed portion 821; an LED light source 804 coupled to the lens 802; an annular mounting surface 814 coupled to the lens 802 and the LED light source 804; a structure 808 mounted on at least a portion of the annular mounting surface 814; and/or a diffuser plate 816 at the OD from the LED light source 804. The LED light source 804 is at the center of circular (X, Y, Z) coordinates.

The structure 808 may be mounted on part of the annular mounting surface 814 and may scatter and redirect light that would otherwise travel along paths 832 and 833 without structure 808 in other directions. In an example, a coating portion (e.g., using any of the coating techniques described with respect to FIG. 5), not shown, may be included on structure 808 to further enhance the refractivity of light. In an example, the structure 808 may be made out of any material, including, but not limited to, the following example materials: PMMA, silicon, aluminum, and/or silicon carbide. The structure 808, with or without a coating, may redirect the light away from its default path. In an example, a portion of the light is reflected and refracted from the structural portion 808 of the optical lens 802 so that luminance uniformity of the backlight device 800 is increased.

Figure 9:
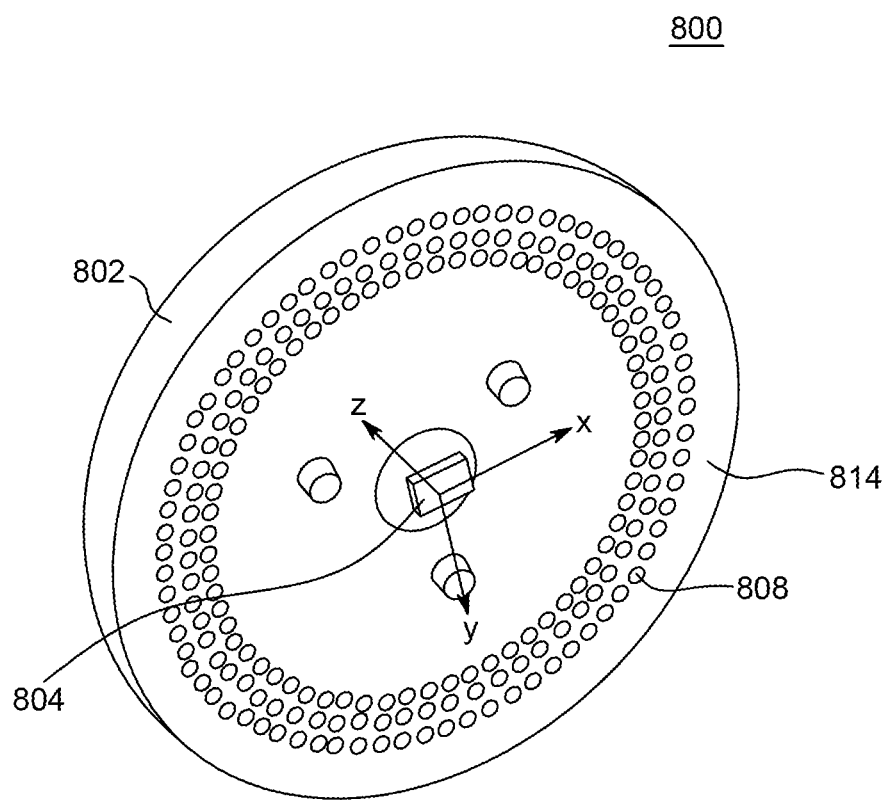
FIG. 9 is a 3D perspective view of the example backlight device with optical lens shown in FIG. 8.

FIG. 9 is a 3D perspective view of the example backlight device 800 with optical lens 802 shown in FIG. 8. With reference to FIG. 9, the backlight device 800 includes the lens 802 coupled to the annular mounting surface 814 and coupled to the LED light source 804. The ring on the bottom of the annular mounting surface 814 is the structure portion 808, and may vary in color, size, length, and coating, among other things, depending on the intended application of the backlight device 800.

In the disclosure described herein, the optical lens may be made from any material, including, but not limited to, the following materials: PMMA; polyethylene terephthalate (PET); polycarbonate (PC); polystyrene (PS); and/or glass. The disclosure described herein includes example embodiments, such that a person skilled in the art could modify, alter, omit or replace the described elements with equivalent elements.

What is claimed is:

1. An illumination device, comprising:
   a lens configured to redistribute light from a light source, the lens being rotationally symmetric about an optical axis,
   the lens including a concave inner surface configured to face the light source,
   the lens including a substantially planar surface that is substantially orthogonal to the optical axis and extends radially outward from a periphery of the concave inner surface,
   the planar surface including a coated annular region on which a coating is disposed,
   the coating configured to absorb at least a portion of the light inside the lens that strikes the coated annular region,
   the planar surface further including an uncoated inner annular region between the coated annular region and the concave inner surface,
   the planar surface further including an uncoated outer annular region between the coated annular region and an outer periphery of the planar surface.

2. The illumination device of claim 1, wherein the lens further includes an outer surface configured to face away from the light source, the outer surface adjoining the planar surface at the outer periphery of the planar surface.

3. The illumination device of claim 2, wherein the outer surface includes a recessed portion centered at the optical axis that recesses inwardly toward the concave inner surface.

4. The illumination device of claim 2, wherein the outer surface includes a convex portion extending between the cylindrical portion and the recessed portion.

5. The illumination device of claim 2, further comprising a diffuser plate positioned adjacent the outer surface of the lens.

6. The illumination device of claim 5, wherein the diffuser plate includes a plurality of plastic sheets.

7. The illumination device of claim 1, wherein the concave inner surface is shaped to include, in part, at least one shape selected from shapes including an ellipsoid, a sphere, a paraboloid, and a continuous spline curve.

8. The illumination device of claim 1, wherein the lens includes a material selected from materials including polymethyl methacrylate, polyethylene terephthalate, polycarbonate, polystyrene, and glass.

9. The illumination device of claim 1, wherein the coating comprises a black coating configured to absorb all colors of light that strikes the coating.

10. The illumination device of claim 1, wherein the coating comprises a colored coating configured to reflect light of a first color that strikes the coating and absorb light of other colors that strikes the coating.

11. The illumination device of claim 1, wherein the coating comprises an ink.

12. The illumination device of claim 1, wherein the coating comprises a yellow coating configured to absorb bluish light and emit yellow light to produce white light inside the lens.

13. The illumination device of claim 1, wherein the coating is configured to absorb between about 10% and about 100% of light that strikes the coating.

14. The illumination device of claim 1, further comprising the light source, the light source having an emission surface that is centered on the optical axis and orthogonal to the optical axis, the emission surface configured to emit light in an angular distribution that is radially symmetric about the optical axis.

15. The illumination device of claim 1, further comprising a screen backlight coupled to the lens.

16. An illumination device, comprising:
   a light source having an emission surface, the emission surface defining an optical axis that extends substantially orthogonally from a center of the emission surface, the light source configured to emit light in an angular distribution that is substantially radially symmetric about the optical axis; and
   a lens that is rotationally symmetric about the optical axis, the lens being configured to:
      receive the emitted light from the light source,
      increase a uniformity of the emitted light to form redistributed light, and
      direct the redistributed light away from the light source in an angular distribution that is radially symmetric about the optical axis,
   the lens including a concave inner surface that faces the light source, the concave inner surface being substantially radially symmetric about the optical axis,
   the lens including a substantially planar surface that is substantially orthogonal to the optical axis and extends radially outward from a periphery of the concave inner surface,
   the planar surface including a coated annular region on which a coating is disposed,
   the coating configured to absorb at least a portion of the light inside the lens that strikes the coated annular region,
   the planar surface further including an uncoated inner annular region between the coated annular region and the concave inner surface,
   the planar surface further including an uncoated outer annular region between the coated annular region and an outer periphery of the planar surface.

17. The illumination device of claim 16, wherein the lens further includes an outer surface that faces away from the light source and adjoins the planar surface at the outer periphery of the planar surface.

18. The illumination device of claim 17, wherein the outer surface is radially symmetric about the optical axis.

19. The illumination device of claim 17, further comprising a diffuser plate positioned adjacent the outer surface of the lens.

20. An illumination device, comprising:
   lens that is rotationally symmetric about an optical axis, the lens being configured to:
      receive emitted light from a light source, the emitted light being substantially radially symmetric about the optical axis,
      increase a uniformity of the emitted light to form redistributed light, and direct the redistributed light away from the light source in an angular distribution that is substantially radially symmetric about the optical axis, the lens including a concave inner surface configured to face the light source, the concave inner surface being substantially radially symmetric about the optical axis, the lens including a substantially planar surface that is substantially orthogonal to the optical axis and extends radially outward from a periphery of the concave inner surface, the planar surface including a coated annular region on which a coating is disposed, the coating configured to absorb at least a portion of the light inside the lens that strikes the coated annular region, the planar surface further including an uncoated inner annular region between the coated annular region and the concave inner surface, the planar surface further including an uncoated outer annular region between the coated annular region and an outer periphery of the planar surface.

\* \* \* \* \*

UNITED STATES PATENT AND TRADEMARK OFFICE
CERTIFICATE OF CORRECTION

PATENT NO. : 11,242,977 B2  
APPLICATION NO. : 16/749853  
DATED : February 8, 2022  
INVENTOR(S) : Feng Page 1 of 1

It is certified that error appears in the above-identified patent and that said Letters Patent is hereby corrected as shown below:

On the Title Page

Item (30), in "Foreign Application Priority Data", in Column 1, Line 1, after "Data", insert --¶Jun. 5, 2017 (CN) PCT/CN2017/087128--

On page 2, in Column 1, Item (56), under "U.S. Patent Documents", Line 13, delete "2013/0022981" and insert --2013/0229810-- therefor Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*